United States Patent [19]

Urquhart

[11] Patent Number: 4,503,514

[45] Date of Patent: Mar. 5, 1985

[54] COMPACT HIGH SPEED HASHED ARRAY FOR DICTIONARY STORAGE AND LOOKUP

[75] Inventor: Robert J. Urquhart, Austin, Tex.

[73] Assignee: International Business Machines Corporation, Armonk, N.Y.

[21] Appl. No.: 335,478

[22] Filed: Dec. 29, 1981

[51] Int. Cl.[3] .............................................. G06F 5/00
[52] U.S. Cl. ..................................... 364/900; 364/300
[58] Field of Search ... 364/200 MS File, 900 MS File, 364/737, 300; 371/2, 25, 26, 51, 54

[56] References Cited

U.S. PATENT DOCUMENTS

| | | | |
|---|---|---|---|
| 3,717,851 | 2/1973 | Cocke | 364/200 |
| 3,925,761 | 12/1975 | Chaires et al. | 340/146.3 |
| 3,932,859 | 1/1976 | Kyriakides | 364/900 |
| 3,949,208 | 4/1976 | Carter | 371/3 |
| 3,995,254 | 11/1976 | Rosenbaum | 340/146.3 |
| 4,159,536 | 6/1979 | Kehoe et al. | 364/900 |
| 4,290,105 | 9/1981 | Cichelli et al. | 364/200 |
| 4,339,806 | 7/1982 | Yoshida | 364/900 |
| 4,375,100 | 2/1983 | Jsuji et al. | 371/51 |

Primary Examiner—James D. Thomas
Assistant Examiner—David Y. Eng
Attorney, Agent, or Firm—John W. Henderson, Jr.; Douglas H. Lefeve

[57] ABSTRACT

An improved method for storing and rapidly accessing a dictionary file of encoded data for use in verifying the correct spelling of input words. Dictionary words are numerically encoded and hashed into magnitude and unique angle pairs. The hashed pairs are sorted and the magnitudes are mapped into a pointer bit vector containing a binary representation for each possible magnitude value and a binary representation for each actual magnitude value. The pointer bit vector is coordinated with the angle values which are stored as is. The spelling of input words is checked by hashing the input word and using the magnitude as an access to the pointer bit vector which yields pointers to all angles having the same magnitude as the input word. These angles are compared to the angle calculated for the input word and an indicator produced to show the result of the comparison and thereby whether the input word is correctly spelled.

4 Claims, 7 Drawing Figures

COMPACT HIGH SPEED HASHED ARRAY FOR DICTIONARY STORAGE AND LOOKUP

DESCRIPTION

1. Technical Field

This invention relates generally to text processing systems and, more particularly to methods and means in a text processing system for compactly storing and accessing a dictionary of text words for spelling verification.

2. Background Art

Prior art text processing systems which include functions for verifying whether input words are spelled correctly typically include a permanent storage dictionary of high usage words. Stemming from the limited storage capacity of microprocessor driven text processing systems is the continuing pursuit of methods to compactly store and rapidly access the storage dictionary for spelling verification functions. One such prior art function for dictionary compaction is disclosed in U.S. Pat. No. 3,925,761 entitled "Binary Reference Matrix For A Character Recognition Machines", issued Dec. 9, 1975 to A. M. Chaires, et al. and assigned to the present assignee. Chaires, et al. discloses a binary reference matrix wherein each letter in the alphabet is assigned a unique numeric value and the values are hashed to calculate a vector magnitude and angle for each dictionary word. The magnitude and angle form the x and y coordinates for the matrix with a binary 1 being stored in each position of the matrix representing a valid dictionary word and a binary 0 in those positions not representing a valid dictionary word. While the organization of the binary reference matrix minimizes the size of the array needed for accurate verification by choosing numerical values for the alphabetic characters in an inverse proportion to the characters' propensity for error, the representations for the dictionary words in the Binary Reference Matrix (BRM) are not unique and error events must be associated with a propensity to map a garbled word into a sparsely populated region of the matrix to minimize the likelihood of false verification due to round off error in the magnitude and angle BRM representations. This necessitates that a substantial number of blank storage locations be provided in order to create the sparsely populated region required.

An improvement to the BRM vector storage technique was disclosed in U.S. Pat. No. 3,995,254 entitled "Digital Reference Matrix For Word Verification", issued Nov. 30, 1976 to W. S. Rosenbaum and assigned to the present assignee. Rosenbaum discloses apparatus, including a storage array containing digital representations for the vector magnitude and angle of each valid dictionary entry. The digital representations are determined in accordance with an alpha word vector representation formula which produces a magnitude and an absolutely unique angle for each word represented. The magnitudes and angles are then runlength encoded into the storage array. Since the actual magnitudes and angles are stored in the storage array in Rosenbaum, the need for a sparsely populated region to minimize the likelihood of false verification occurring in Chaires, et al. is eliminated. However, Rosenbaum requires storage of the actual magnitude and angle values which are then compared to magnitude and angle values calculated for an input word to determine if the input word appears in the dictionary. Although Rosenbaum discloses a technique for compacting the magnitude values by indexing sequential magnitude values, the index function requires four bits which must be decoded, thus slowing the operation of the dictionary access algorithm.

SUMMARY OF THE INVENTION

The present invention discloses an improved method for storing and rapidly accessing a dictionary file of encoded data for use in verifying the correct spelling of input words. Dictionary words are numerically encoded and hashed into magnitude and angle pairs. The resulting pairs are sorted first by magnitude and then by angle for equal magnitudes. The magnitudes are then mapped into a pointer bit vector containing a binary representation for each possible magnitude value and a binary representation for each actual magnitude. The pointer bit vector is coordinated with the angle values which are stored as is. An input word whose spelling is to be verified is likewise hashed. Its magnitude value provides access to the pointer bit vector which yields pointers to all angles having the same magnitude as the input word. These angles are compared to the angle calculated for the input word and an indicator produced to show the result of the comparison and correspondingly whether the input word is correctly spelled. The pointer bit vector for representing the magnitude values minimizes storage requirements by using only two bits of storage per magnitude. Speed is enhanced by requiring very few binary comparisons and an average of less than one actual angle comparison to determine dictionary occupancy.

DESCRIPTION OF THE PREFERRED EMBODIMENT

Figure 1:
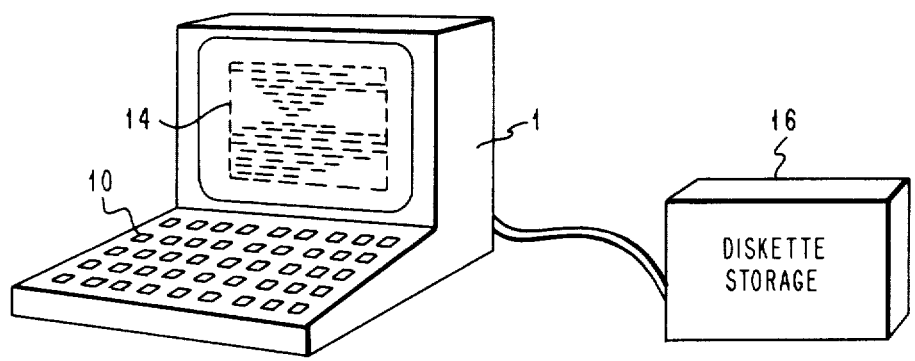
FIG. 1 is a perspective view of an information processing system comprising a terminal and a storage unit.

The invention will now be described as embodied in an interactive information processing system of the type shown in FIG. 1. The information processing system of FIG. 1 comprises a terminal 1 connected to a diskette storage unit 16. Terminal 1 has a display screen 14 and a keyboard 10. Through operation of the keyboard 10 an operator can enter commands to terminal 1 to cause information to be transferred between terminal 1 and the diskette storage device 16. The operator can further enter alphanumeric characters and commands for control of the display on screen 14.

Figure 2:
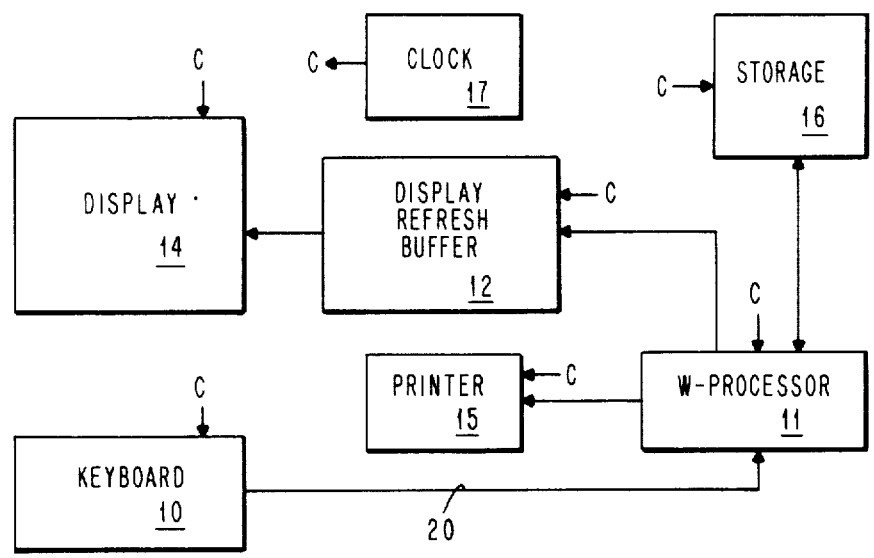
FIG. 2 is a block diagram of the information processing system of FIG. 1.

FIG. 2 shows a more detailed illustration of the information processing system of FIG. 1 in block diagram form. As further illustrated in FIG. 2, the information processing system comprises a keyboard 10, microprocessor 11, a display refresh buffer 12, a display device 14, and an auxiliary direct access storage device 16 such as a diskette drive. Additionally, a printer 15 is shown connected to the processor 11 for providing hard copy output and a clock 17 for keeping the various components of the system in synchronism is shown effectively coupled to each of the units.

Keyboard 10 comprises a normal set of graphic symbol keys such as letters, numbers, punctuation marks, and special character keys, plus text format or control keys like carriage return, tab, index, etc. In addition, the keyboard 10 includes a second set of control keys for issuing special control commands to the system. The control keys include cursor movement keys, keys for setting the keyboard into a number of different modes, etc.

Figure 3:
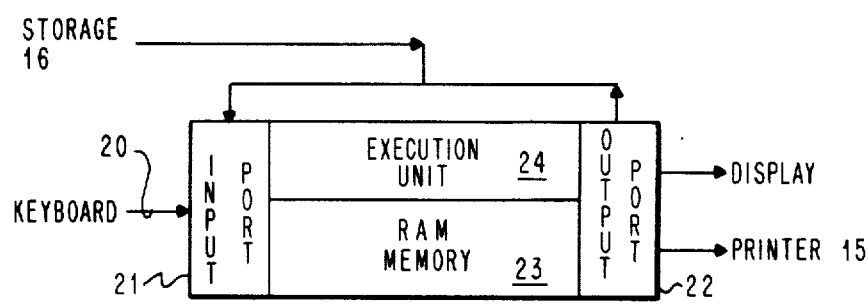
FIG. 3 is a functional diagram of the microprocessor shown in FIG. 2.

Keyboard 10 is connected to the microprocessor 11 by means of a bus 20. The microprocessor 11 as shown in FIG. 3 comprises an input port 21, an output port 22, a random access memory 23, and a process execution unit 24.

Figure 4:
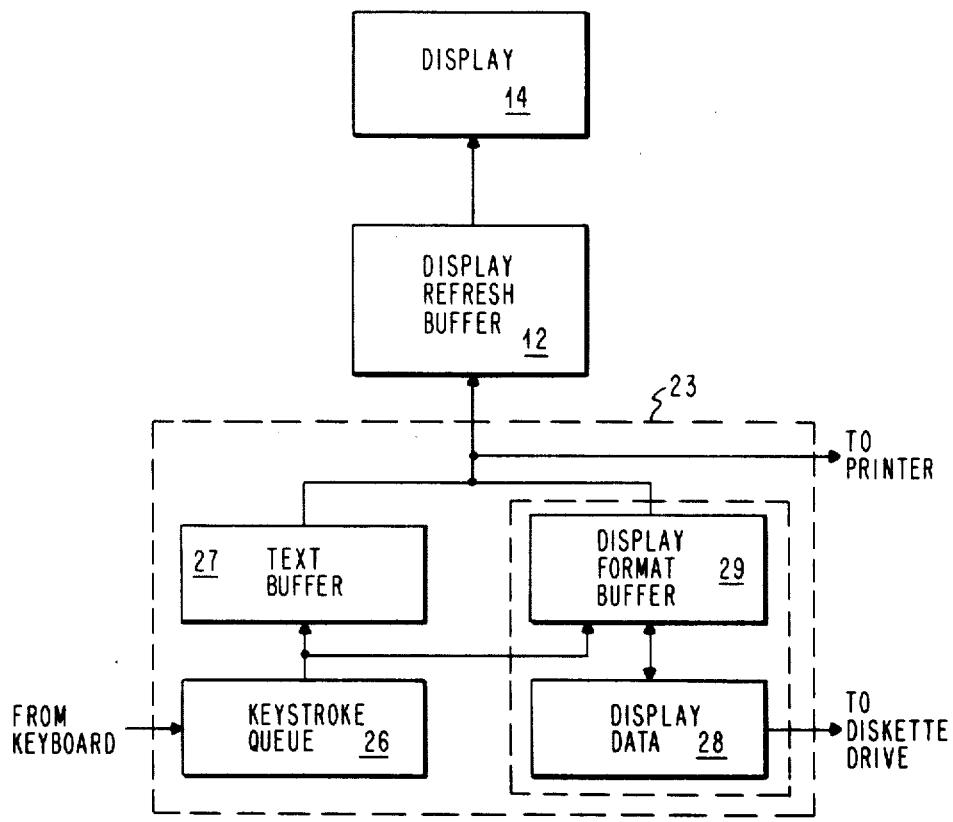
FIG. 4 is a functional diagram illustrating the data flow path between portions of the memory and a microprocessor and the display refresh buffer.

Functionally, memory unit 23 stores both instructions and data. Instructions and data are entered into memory 23 from the keyboard 10 as bytes of binary information through input port 21. As shown in FIG. 4, the section of the RAM 23 which receives the keystroke data from the keyboard 10 is designated keystroke queue 26. Data to be displayed is transferred by a series of instructions from queue 26 to the text buffer section 27 and then to the display refresh buffer 12 through the output port 22 of the microprocessor 11. This is achieved in a conventional way by the microprocessor 11 executing a series of move instructions.

The microprocessor 11 may be an IBM Series 1, Intel Model 8086, or any other recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the electron beam as it traces a series of horizontal lines across the screen.

The output port 22 also supplies data stored in memory 23 to the printer 15 and disk storage unit 16, each of which may have their own internal buffers which are not shown. Commands to transfer data from the random access memory 23 to the printer 15 or storage unit 16 are sent to the microprocessor 11 by the operator from the keyboard 10.

Printer 15 may be any suitable printer known in the art. In most text processing systems, the printer 15 is basically a standard input/output terminal printer having a type ball print element or a daisy-wheel print element.

Disk storage 16 may also be any suitable disk storage device which is capable of storing serial by byte data supplied to it at determined sector address locations, each of which are randomly addressable by the microprocessor 11 to retrieve the data. Spatially related data supplied from disk drive 16 is stored in the display data area 28 of the memory 23 in encoded form. The other section of memory 23 shown in FIG. 4 is the display format buffer area 29 which is involved in the handling of spatially related data in decoded form in accordance with the present invention.

Figure 5:
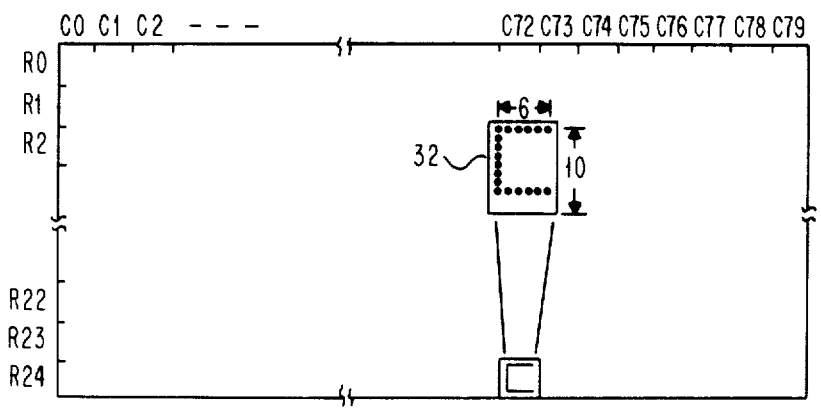
FIG. 5 is a diagrammatic view of the display shown in FIG. 1.

FIG. 5 is a schematic representation of the screen of display device 14. As shown in FIG. 4, the screen has, for example, the capability of displaying 25 lines of characters where each line consists of 80-character column positions. In practice, one character position consists of a matrix of dot positions or picture elements referred to as pels. A typical character matrix for a display of the type represented by device 14 would be a matrix of six wide by ten high pels, which has been designated by the reference number 32 in FIG. 4. The interaction of the refresh buffer 12 and the display 14 is to convert the characters stored at a location in the buffer 12 to the corresponding character as formed in a 6×10 dot matrix at the equivalent location on the display 14. Display 14 generally is provided with its own set of electronics to achieve that conversion. The microprocessor 11 need only supply the address and load the buffer 12 with the appropriate characters.

The disk storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the disk. Data from the device 16 is supplied to the microprocessor 11 serial by byte from the addressed sector and storage tracks when requested.

It will be understood that all of the above described functions and interactions involving the microprocessor 11 are achieved through suitable programs which are also stored in memory 23 and which are called into operation in response to data from the keyboard 10 or interrupt signals generated by the various components of the system shown in FIG. 1.

Figure 6:
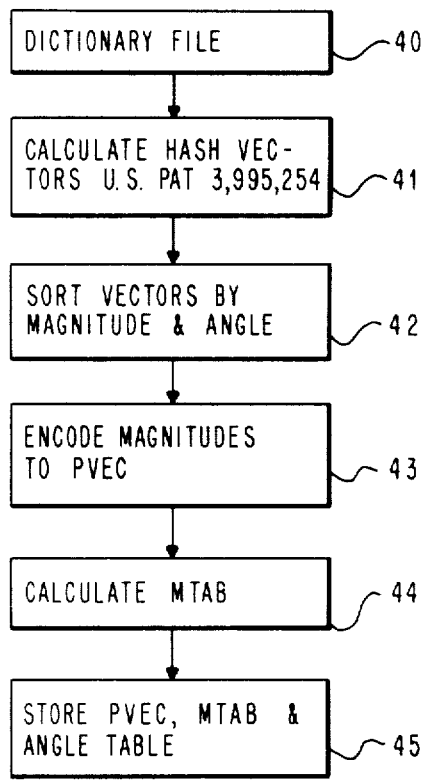
FIG. 6 is a logical flow diagram showing the functional operation of the encoding function of the present invention.
Figure 7:
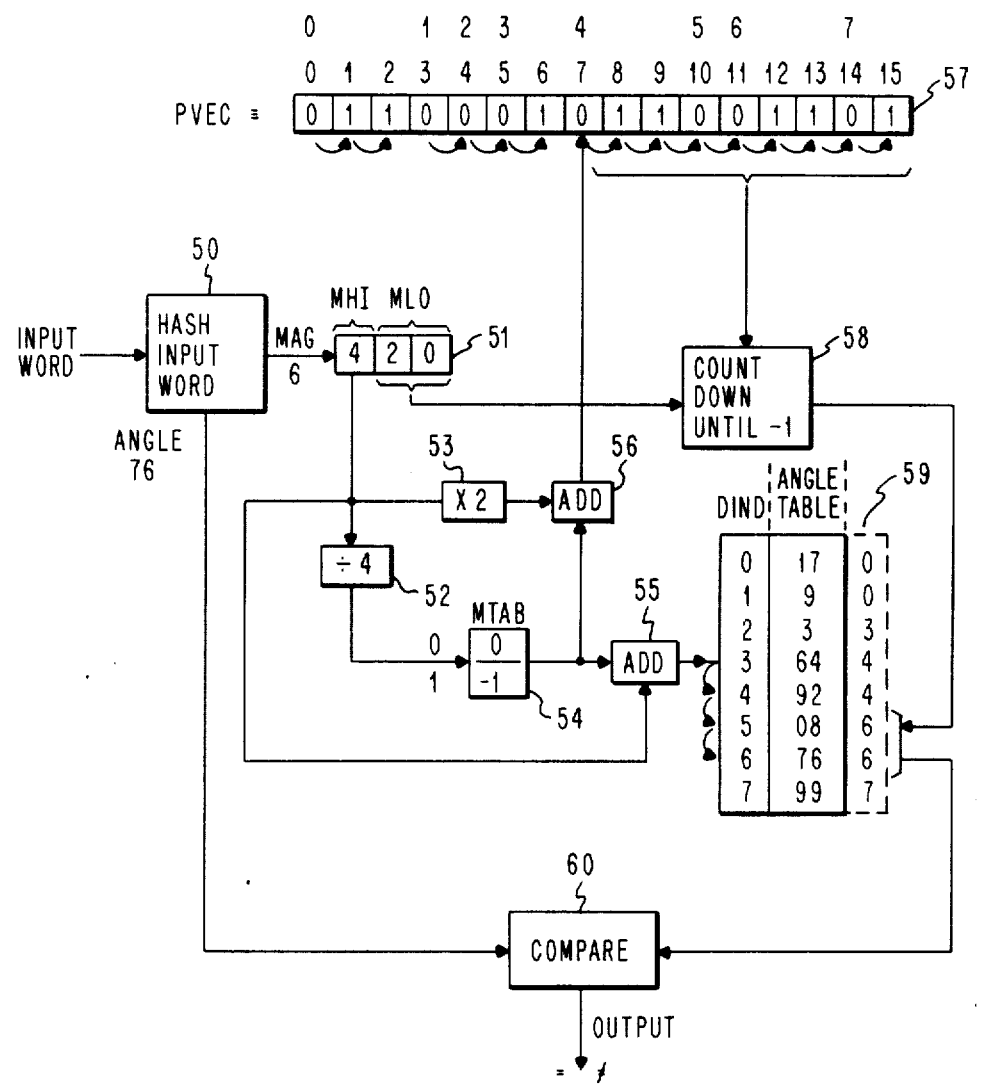
FIG. 7 illustrates a detailed flow operation of the verify function of the present invention.

The present invention which utilizes the system combination is now described with reference to FIG. 2, 6 and 7. FIG. 6 shows a logical flow diagram of the function for encoding a dictionary file of text words in accordance with the present invention. It is readily apparent that the function for encoding the dictionary file and the function for decoding input words are very similar. Therefore, a very detail explanation of the encoding scheme will only be discussed with reference to FIG. 7.

Referring now to FIG. 6 the dictionary file to be encoded for storage in the system memory 23 or diskette storage device 16 is input in block 40 to a hash algorithm in block 41. The details of the hash algorithm are similar to the hash algorithm fully described in U.S. Pat. No. 3,995,254 which is hereby incorporated herein by reference. The hash algorithm assigns a numerical value to each character in each word and calculates a vector magnitude and angle representation for each word. The flow continues into block 42 wherein the vector values are sorted, first by magnitude, and then by angle value within the magnitudes.

In block 43 the magnitude values are encoded to produce a pointer bit vector, PVEC. The magnitude hash algorithm is modified to provide a magnitude range of zero to N−1 and to spread the magnitudes resulting from hashing the N dictionary words uniformly over this magnitude range. This is accomplished by using modulo N arithmetic and chosing magnitude weighting values such that word magnitudes wraparound the range often enough to randomize the magnitude values.

Let $m(i)$ and $a(i)$ represent the i-th magnitude-angle pair after the file has been hashed and sorted (i=0 to N−1 where N is the number of words in the dictionary). A pointer bit vector (PVEC(j) j=0 to 2N−1) of exactly 2N bits is constructed. There are exactly N zeros and N ones in PVEC. Each zero represents one of the possible magnitude values (i.e. 0,1, ... N−1). Each m(i) is represented by a single 1. The one representing the i-th magnitude (m(i)) is located at the (i+m(i)+1)-th bit position of PVEC.

This vector contains all the information of the original magnitudes while requiring exactly 2 bits for each word. This mapping is accomplished by the following loop:

do i=0 to N−1
 PVEC(i+m(i)+1)=1
end

This vector can be interpreted as follows: The j-th zero (counting from j=0) can be viewed as a place holder for any magnitudes, m(i)'s, that are equal to j. All m(i)'s that have a value of j, are represented by ones that immediately follow this j-th zero. If, for example, three of the m(i)'s are equal to 174 then there are exactly three ones following the 174-th zero. The k-th one (k=0 to N−1) in PVEC represents the k-th dictionary entry in the given sort sequence.

Following encoding of the pointer bit vector in block 43, flow continues into block 44 where an indexing table called MTAB is calculated to provide a means for rapidly accessing the pointer bit vector without having to scan from the beginning of the pointer bit vector on each access. The spacing of the entry points into the pointer bit vector is a designer's choice based on the total number of dictionary entries. The average search length based on starting at the beginning of the pointer bit vector, PVEC, is N/2, where N represents the total number of dictionary entries. If an indexing delta, MDEL, is selected then MTAB is calculated to provide a search distance in PVEC from nearest MDEL entry point. Thus the average search is cut to MDEL/2. The indexing technique used points directly to the zero in PVEC which represents the nearest multiple of MDEL and scans from this based on a calculation of the modulo MDEL of the magnitude. For example, assume the selected indexing value is MDEL=32. For magnitude MAG=89, then the zero for 64 is pointed to directly and PVEC is scanned from that point forward for 25 magnitude values.

A routine for calculating the indexing table for a simple dictionary of eight words (N=8) using the indexing delta of four (MDEL=4) is shown in Table 1. As was previously stated, the pointer bit vector PVEC contains 2 bits for each word magnitude or 2N bits. Therefore, for N=8, PVEC contains 16 bits. The bit positions places in PVEC are identified by j=0 to 15 in Table 1. The magnitude values for the eight words are shown as MAG(i).

TABLE 1

```
MDEL = 4
MMOD = 0
PVEC(i) = 0 (for i = 0 to 2N−1)
DO i = 0 to N−1
PVEC (i + MAG(i) + 1) = 1
IF MAG(i) ≧ MMOD THEN DO
MTAB (MMOD/MDEL) = i-MMOD
MMOD = MMOD + MDEL
END
END
```

| i         | 0 | 1 | 2 | 3 | 4 | 5 | 6 | 7 |
|-----------|---|---|---|---|---|---|---|---|
| MAG(i)    | 0 | 0 | 3 | 4 | 4 | 6 | 6 | 7 |
| j         | 0 1 2 3 4 5 6 7 8 9 | | | 10 | 11 | 12 13 | 14 | 15 |
| PVEC      | 0 1 1 0 0 0 1 0 1 1 | | | 0  | 0  | 1 1   | 0  | 1  |
| MMOD      | 0 | | | | 4 | | | |
| MMOD/MDEL | 0 | | | | 1 | | | |

TABLE 1-continued

| MTAB | 0 | −1 |
|------|---|-----|

The MTAB index points are calculated as a function of the magnitude count and the selected indexing delta. In this example, for magnitudes 0 through 3 MTAB is 0 and for magnitudes 4 through 7 MTAB is −1. This provides an entry point into PVEC at position zero for magnitudes 0 through 3 and an entry at position 7 for magnitudes 4 through 7. The entry point accessing will be more fully described later in conjunction with decoding technique. While the example used here is intentionally simple for ease of explanation, it can readily be seen that this technique can be applied to a much larger dictionary, for example, one containing 50,000 words with an indexing delta of 64 would have an MTAB of 782 entries.

Following the calculation of MTAB in block 44, PVEC, MTAB and a table of the sorted angle values is stored in the diskette storage 16 for use in checking the spelling of input words to the system.

The technique for checking the spelling of an input word will now be described with reference to FIG. 7 and Table 2. Text words whose spellings are to be checked for errors may be input to the system through the keyboard 10 as part of a data entry operation or may be input from the diskette storage 16 as part of a data revision operation. In any event the text words are stored in the processor memory 23 for verification against the system dictionary which is encoded as described above. Each input word then must be similarly encoded prior to comparison to the system dictionary. The encoding is accomplished by inputting the word through the hash algorithm 50 to produce a magnitude and angle representation of the word. The example shown in FIG. 7 is a dictionary representation and decode for the eight word dictionary described above with reference to Table 1. Table 2 is a program routine for performing the function of FIG. 7. Assume that the encoding of the input word produces a magnitude of 6 and an angle value of 76. The magnitude value is broken into high and low components in register 51. The low component is the modulo indexing delta of the magnitude. Recall from the discussion of Table 1 that the indexing delta (MDEL) is 4. The high component of the magnitude is the magnitude value minus the low component.

TABLE 2

```
MATCH = 0
MLO = MOD (MAG, MDEL)
MHI = MAG−MLO
DIND = MHI + MTAB (MHI/MDEL)
PIND = 2MHI + MTAB (MHI/MDEL)
DO i = PIND to PIND +32 until (MLO = −1)
IF PVEC(i) = 1 THEN DIND = DIND + 1
ELSE MLO = MLO−1
END
DO j = i+1 to i+16 WHILE (PVEC (j) = 1)
IF A (DIND) = ANGLE THEN DO
MATCH = 1
j = j+16
END
ELSE IF A (DIND) > ANGLE THEN j = j+16
DIND = DIND +1
END
```

The high component of the magnitude is divided by MDEL in 52 and the result provides access to the indexing table 54 to produce an adjustment to the entry point into the pointer bit vector PVEC. A result in 52 of zero produces an MTAB value of zero and a result of one produces an MTAB value of minus one. In this example an MTAB value of minus 1 is produced and added in block 55 to the low component of the magnitude and added in block 56 to two times the high component. This produces an access point DIND into the angle table 59 at position 3 and an access point PIND (Table 2) into PVEC 57 at position 7. PVEC is then scanned to the right and the angle table is scanned downwardly. Each zero encountered in PVEC causes the MLO output of register 51 to be decremented until a value of minus one is reached. Each one encountered increased the angle table index value DIND by one. When the MLO value reaches minus one the angle values corresponding to and following DIND are compared to the angle generated for the input word. If an equal compare occurs a code is set indicating that the input word is spelled correctly. If the angle value from the angle table exceeds the angle value for the input word then a code is produced indicated that the input word is not spelled correctly.

As was previously stated, the invention has been described using an example of a small dictionary for ease of explanation. However, it is readily apparent that the scope of this invention is applicable to very large dictionaries by simply changes the values of MDEL and the size of PVEC.

While the invention has been particularly shown and described with reference to a specific embodiment thereof, it will be understood by those skilled in the art that the foregoing and other changes in form and detail may be made therein without departing from the spirit and scope of the invention.

I claim:

1. A control system for controlling a text processing machine to verify the presence of an input character string in a dictionary of character strings comprising:
    means for calculating a magnitude and angle representation for each of N dictionary character strings;
    means for sorting said magnitude and angle representations into numerical order;
    a memory buffer of 2N bit locations;
    means for activating a binary bit of a first polarity in said memory buffer for each of the possible N magnitude representations;
    means for calculating a modulo N value for each of the N magnitude representations;
    means for activating a binary bit of a second polarity opposite said first polarity in said memory buffer adjacent each binary bit of said first polarity for each modulo N value calculated;
    means for storing said angle representations corresponding to said calculated modulo N values;
    means for receiving an input character string and calculating a magnitude and angle representation for said input character string;
    means for calculating the modulo N value of the magnitude representation of said input character string;
    means for scanning said memory buffer for binary bits of said second polarity adjacent said binary bit of said first polarity representing the modulo N value of the input character string magnitude representation;
    means for synchronously scanning the corresponding angle representations;
    means for comparing all angle representations corresponding to the binary bit of said second polarity adjacent the binary bit of said first polarity corresponding to the modulo N value of the input word to the input word angle representation; and
    means for outputting a signal indicating whether the compare is equal or not equal.

2. The control system of claim 1 wherein said means for activating a binary bit of a first polarity activates a binary 0 and said means for activating a binary bit of a second polarity activates a binary 1.

3. The control system of claim 1 or claim 2 wherein said means for activating a binary bit of a second polarity includes means for calculating a table of address points for said memory buffer based on the relative positioning of said binary signals of second polarity in said memory buffer and means for storing said table of address points.

4. The control system of claim 3 wherein said means for calculating the modulo N value of the magnitude representation of said input character string includes means for accessing said table of address points for the memory buffer address nearest said calculated modulo N value for the input character string.

* * * * *